March 23, 1937.  F. W. FALTERMAYER  2,074,997
SPEED CHANGE DEVICE
Filed Aug. 3, 1934  4 Sheets-Sheet 2

INVENTOR.
FREDERICK W. FALTERMAYER,
BY
Leonard L. Kalish
ATTORNEY.

Patented Mar. 23, 1937

2,074,997

UNITED STATES PATENT OFFICE 2,074,997

SPEED CHANGE DEVICE

Frederick W. Faltermayer, Philadelphia, Pa.

Application August 3, 1934, Serial No. 738,233

3 Claims. (Cl. 74—230.17)

My invention relates to a speed change device and it relates more particularly to a speed change device in which the mechanical ratio between driving member and driven member may be quickly varied without stoppage of the machine.

The object of my invention is to provide a speed change device useful in any power transmission, and also useful as a more or less integral part of machine tools, such as drill presses, lathes, milling machines, etc., as well as production machinery of all kinds in which it is desired to operate the machine at varying speeds.

A further object of my invention is a speed change device devoid of gears and requiring no meshing of gears or other toothed clutches and in which substantial amounts of power may be transmitted with varying mechanical ratios between driving and driven members and wherein the variation in mechanical ratio may be quickly effected while the machine is running. With the above and other objects in view which will appear more fully from the following description, my invention consists of a speed change device comprising two juxtaposed and cooperating belt-receiving pulley-like members, a belt interconnecting the same, and means in each of said pair of juxtaposed members for varying the effective diameter of the same, and means common to said two members and operatively inter-relating each to the other, for causing a generally equal and simultaneous but opposite variation in diameters of said two members.

My invention further consists of a pair of juxtaposed and cooperative belt-receiving pulley-like members, each comprising a series of coaxially disposed nested cylindrical sleeves slidable axially with respect to each other, and having similarly inclined or similarly tapering conical operative end surfaces, and a similarly inclined and opposite conical flange or member common to and juxtaposed to said series of nested cylindrical sleeves for forming with the conical ends of said sleeves, an annular V-shaped groove, the effective diameter of which varies according to the particular sleeve brought into operative relation to said conical flange or member, and means for controlling the axial movements of said sleeves with respect to each other.

My invention further consists of other novel features as well as novel details of construction, all of which will appear more fully from the following detailed description.

For the purpose of illustrating my invention, I have shown in the accompanying drawings, one form thereof which is at present preferred by me, since the same has been found in practice to give satisfactory and reliable results, although it is to be understood that the various instrumentalities of which my invention consists can be variously arranged and organized and that the invention is not limited to the precise arrangement and organization of the instrumentalities as herein shown and described.

Referring to the drawings in which like reference characters indicate like parts:

As stated above, my invention may be practiced in the form of power transmission units of variable mechanical ratio, or the invention may be applied to specific machines such as machine tools or production machinery of any kind where variable drive is desired.

Figure 1:
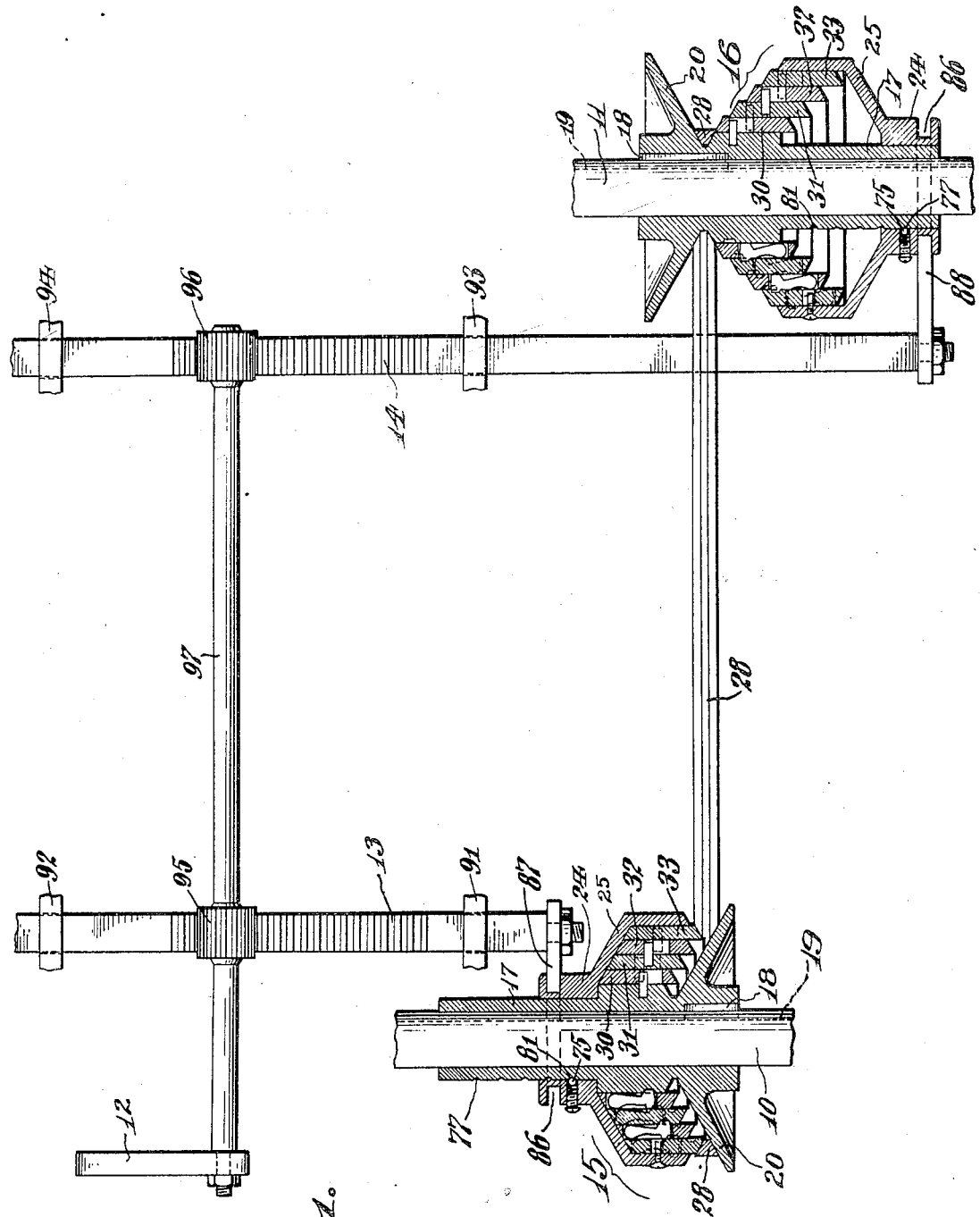
Figure 1 represents a general arrangement in vertical sectional view of a speed change device embodying my invention.

In Figure 1, I have illustrated an embodiment of my invention such as may be applied, for instance, to a drill press in which the shaft 10 would be the drill press spindle and in which the shaft 11 may either be a suitable countershaft which may be positioned behind the drill press frame or the upright standard of the drill press frame, or in which the shaft 11 may be an electric motor shaft. I have omitted a showing of the bearings and other supporting structure in which the shafts 10 and 11 are journalled and carried, because the application of bearings and supporting structure is merely an obvious mechanical step and because the bearings and supporting structure vary with each different installation of each different use. Thus, the shafts 10 and 11 may be any driven or driving shaft of any power transmission system, or the shaft 10 may be the spindle of a drill press, of a lathe or milling machine, or of any other machine tool, while the shaft 11 may be any suitable counter-shaft either forming a part of the drill press, lathe, milling machine, etc., or it may be a separate counter-shaft, or the shaft of an electric motor, or an auxiliary shaft directly coupled to the shaft of an electric motor. Similarly, my invention may be embodied in separate and complete power transmission units which can be applied to any existing machinery without any alteration. In such embodiment of my invention, power would be applied to the "driving" shaft 11 either through a belt or through gearing (the shaft 11 being provided with any suitable driven pulley, gear, coupling or clutch, through which the power may be imparted) or by direct coupling to any prime mover, and the power from the "driven" shaft 10 would in turn be delivered (to the machine to be driven) also by any suitable belting, gearing, clutch or coupling (the shaft 10 being likewise provided with any suitable pulley, gear, clutch or coupling). Thus, for instance, in embodying my invention in the form of a variable-speed power transmission unit, the entire mechanism shown in Figure 1, with the exception of the operating handle 12, may be completely encased in any suitable housing having the necessary bearings within which the shafts 10 and 11 may be journalled and having necessary guides within which the racks or equivalent elements 13 and 14 may be slidably mounted, and merely having one end of each of the shafts 10 and 11 projecting, and having a pulley or other power transmission means provided on the exposed exterior ends of the shafts 10 and 11;—the power being applied to one of such exposed shaft ends and the power being taken off the other of said exposed shaft ends.

Figure 2:
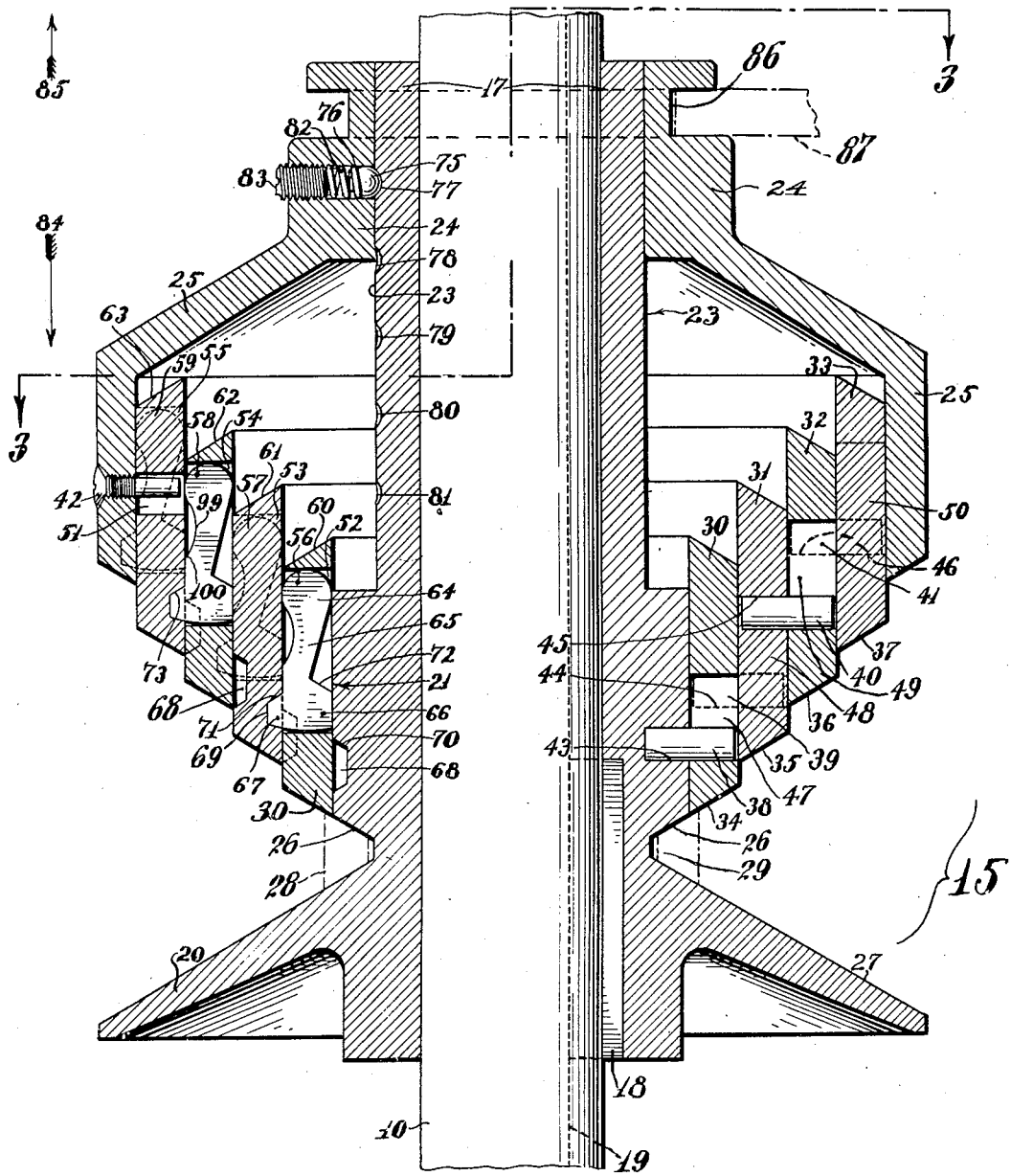
Figure 2 represents a similar sectional view, on a much enlarged scale, of one of the two similar belt-receiving pulley-like members of variable effective diameter, embodying my invention.
Figure 3:
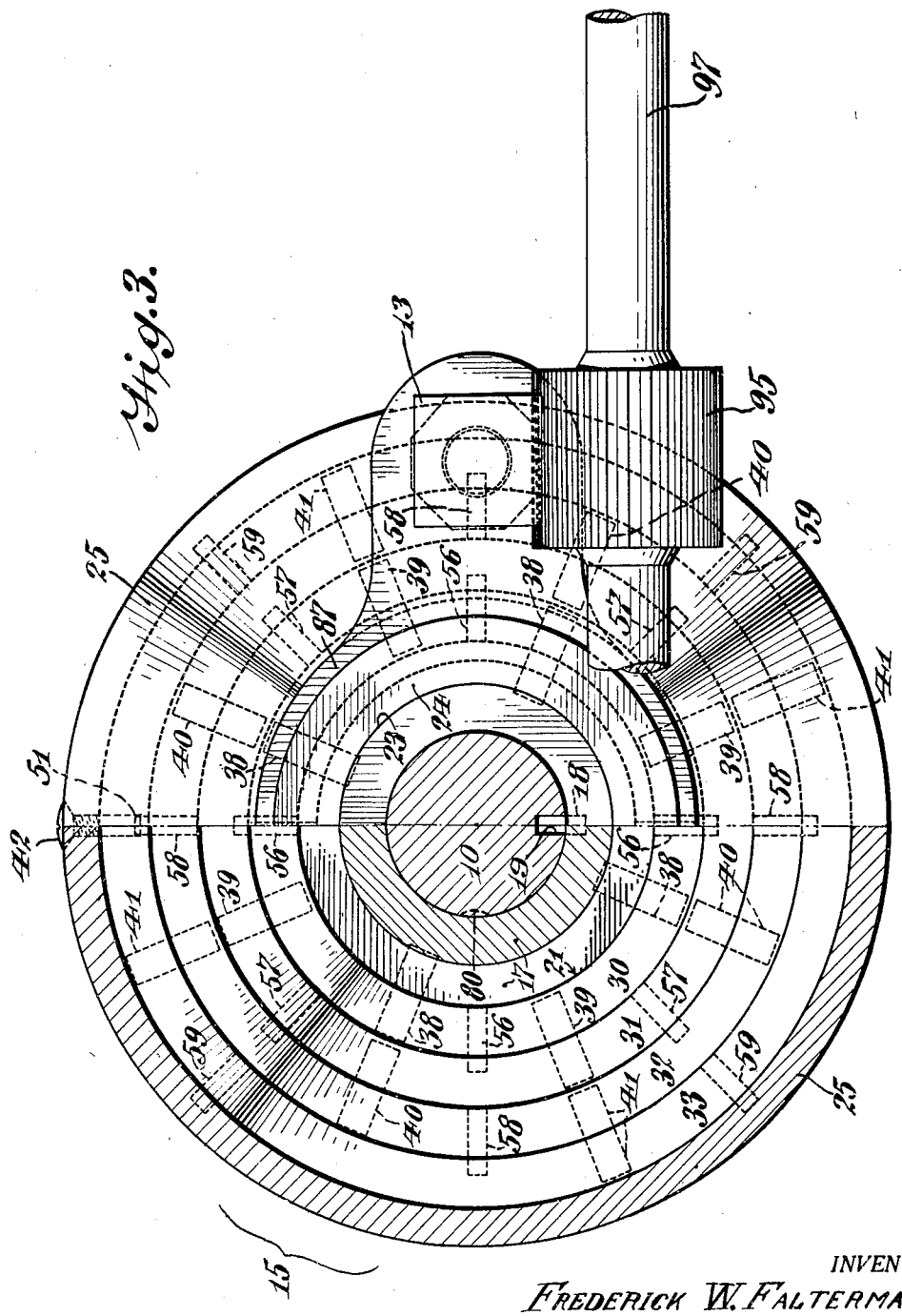
Figure 3 represents a sectional view on line 3—3 of Figure 2.

On each of the shafts 10 and 11, I provide a similar variable diameter belt-receiving device designated generally by the numerals 15 and 16, one of which is illustrated on an enlarged scale in Figure 2. Each of the devices 15 and 16 includes an innermost supporting sleeve 17 which is fixed to the shaft (10 or 11) against rotational displacement with respect thereto, but which may in certain cases be slidably mounted with respect to the shaft so as to permit the shaft to be moved axially, as for instance, in the case of a drill press spindle. Thus, for instance, where it is desired to apply the present invention directly to a drill press or similar machine requiring an axial movement of the driven shaft, the inner sleeve 17 is keyed to the shaft by means of any suitable key 18 running in a suitable keyway 19 in the shaft, so that the shaft may be moved axially to and fro, while the rotational inter-engagement is fixedly maintained between the shaft and the device 15. In this form of installation, means are provided for preventing the axial displacement of the member 17. Thus, the member 17 may be confined endwise between the upper and lower journal brackets and bearing brackets in which the drill press spindle (10) is journalled and carried, thus permitting the drill press spindle to be moved up and down without displacing the sleeve 17 axially.

For the sake of clarity in the illustration of the gist of the invention, such details as set screws etc. have been omitted;—it being understood that any suitable means such as set screws, pins, etc. may be provided for holding the key 18 in place where a slidable expander is to be used, and that the sleeve 17 may be fixedly keyed or pinned or otherwise fixed to the shaft (as for instance, the shaft 11) where no axial sliding relationship is desired on the sleeve 17 and the shaft upon which it is carried.

The sleeve 17 carries at one end thereof a generally conical flange 20 which may be formed integrally therewith or which may be formed separately and then fixedly secured to the sleeve 17. For simplification of illustration, the conical flange 20 is shown as being formed integrally with the sleeve 17. The sleeve 17 is also provided with a cylindrical supporting or bearing portion 21 adapted to carry the innermost sleeve 30 and cylindrical supporting or bearing surface 23 adapted slidably to carry and support the hub 24 of the outermost or operating shell 25. The two supporting or bearing surfaces 21 and 23 are shown as being of different diameters, although I may enlarge the diameter of the surface 23 to any desired extent and may enlarge it to the same diameter as that of the surface 21.

An annular conical surface 26 is also provided in predetermined spaced relation to the conical surface 27 of the conical disc 20, and at an equal and opposite angle so as to form between the surface 26 and the corresponding portion of the surface 27, a generally V-shaped annular groove adapted to receive a V-shaped belt 28 of any conventional form or construction. The dotted lines in Figure 2 represent (in cross-section) the position of a V-shaped belt (of conventional construction) disposed in operative relation to the V-shaped annular groove 29 formed between the surface 26 and the corresponding portion of the surface 27;—said V-shaped annular groove 29 constituting the smallest diameter of the series of different effective diameters of the devices 15 and 16.

Intermediate the cylindrical surface 21 of the inner sleeve 17 and the outer operating shell 25, a series of coaxial and nested or telescoping cylindrical sleeves 30, 31, 32 and 33 are provided (the number of sleeves varying according to the amount of variation desired or according to the number of steps desired in the mechanical ratio of driving and driven elements), having similar inclined or conical operative or belt-engaging surfaces 34, 35, 36 and 37, respectively, and being slidable with respect to each other and with respect to the surface 21 in an axial direction but locked rotationally with respect to each other and with respect to the surface 21. Thus, intermediate the innermost sleeve 17 and the immediately adjacent sleeve 30, and intermediate each two adjacent sleeves, as well as between the outer sleeve 33 and the operating shell 25, suitable keying means are provided for locking these members against rotational displacement with respect to each other, but permitting a limited axial sliding movement, each with respect to the other, to a predetermined extent. In the particular illustration of my invention shown in the drawings, the keying means consists of a series of key pins or key members 38, 39, 40 and 41, respectively, and keying screw 42. These keying pins may be of any suitable cross-section, although in the particular illustration, round dowel-like pins are shown generally radially disposed, the inner ends of which are fixed in corresponding radial apertures 43, 44, 45 and 46, while the outer ends of which extend into longitudinally elongated slots 47, 48, 49 and 50 in the outwardly adjacent sleeve, thereby permitting said outwardly adjacent sleeve to move longitudinally or axially with respect to the inwardly adjacent sleeve to the extent defined by the distance by which the length of the slots 47, 48, 49 and 50 exceeds the corresponding transverse dimension of the keying pins 38, 39, 40 and 41. The length of these slots and the extent of the axial movement of the sleeves with respect to each other are predetermined in a manner hereinbelow more particularly described.

In order to keep the units 15 and 16 as compact as possible for any given size installation, or for any given size belt and number of steps or stages of variation, the series of pins 38, 39, 40 and 41 and the corresponding slots 47, 48, 49 and 50 are preferably not placed in the same radial plane, but are preferably alternately staggered in two different radial planes at any suitable angle to each other, so that the axial length or extent or overall dimension of the sleeves may be kept down to a minimum. It is for this reason that the alternate pins 38 and 40 and the coreponding slots 47 and 49 are visible in the section shown in Figure 2, and are shown in solid lines, while the alternate keying pins 39 and 41 and the corresponding slots 48 and 50 are shown in dotted lines because they are in a different radial plane removed from the plane of the other pins and slots by a suitable number of degrees so that alternate pins and slots clear each other. So too, while in the illustration in Figure 2, only one keying pin is shown intermediate each two adjacent sleeves or members, it is to be understood that several (two, three or four or even more) such pins are preferably interposed between each two adjacent sleeves or members and the innermost sleeve 17 in order to distribute the torque load between two adjacent sleeves onto several pins, and thus prevent any tendency to twist one sleeve with respect to the other, or to prevent the tendency of one sleeve to become cocked with respect to the other sleeve. Thus, the pins and slots shown in Figure 2 may be duplicated once, twice or three or more times around the circumference of the sleeves.

The key screw 42 shown in Figure 2 cooperates with a slot 51 in the outermost sleeve 33 and serves to establish engagement between the sleeves and the operating shell 25. This keying screw 42 and the corresponding slot 51 may also be duplicated several times around the circumference if desired.

Within the sleeves 30, 31, 32 and 33, latch-receiving slots 52, 53, 54 and 55 are provided, within which similar latch members 56, 57, 58 and 59 are disposed with sufficient clearance to permit said latches to move freely within said slots. In the illustration of my invention shown particularly in Figure 2, the slots 5, 2, 53, 54 and 55 are shown as being bounded at both ends. This, however, is not necessary, and I may cut the slots entirely through the rear edges 60, 61, 62 and 63 of the sleeves 30, 31, 32 and 33 so that the slots will have an inner end near the surfaces 34, 35, 36 and 37 of the sleeves but will be open at their opposite ends. This is possible because the latch members 56, 57, 58 and 59 by virtue of their construction and relationship to the sleeves, are held in position regardless of whether the ends of the slots 52, 53, 54 and 55 are closed or open adjacent the surfaces 61, 62 and 63 of the sleeves 31, 32 and 33. For greater ease in manufacture, it is preferable to have the slots 52, 53, 54 and 55 open at their outer ends, that is, to have them cut entirely clear through the terminal surfaces 61, 62 and 63 of the sleeves 31, 32 and 33, respectively.

Each latch is provided with a pivotal portion 64 at one end thereof, the radially transverse dimension of which is preferably slightly less than the radial thickness of the sleeve (and hence, less than the radial dimension of the slot or latch chamber); is provided with a shank portion 65 of the reduced transverse dimension; and is provided with an inner toe 66 and outer toe 67 at the other end of the latch.

In the surface 21 of the innermost stationary sleeve 17 and within the outer cylindrical surface of each of the sleeves 30, 31, 32 and 33, toe-receiving recesses 68 are provided of a contour generally the same as the contour and dimensions of the inner toes 66 of the latch members 56, 57, 58 and 59; while in the inner cylindrical walls of the sleeves 31, 32 and 33 and the inner cylindrical surface of the outer shell 21, toe-receiving recesses 69 are provided of substantially the same contour and dimensions as the outer toes 67 of the latch members 56, 57, 58, and 59.

The end surfaces or walls of the toe-receiving recesses 68 farthest from the conical flange 20, or what may arbitrarily be designated as the inner terminal walls designated by the numeral 70, and likewise the "inner" terminal walls 71 of the toe-receiving recesses 69 are inclined, and the corresponding rearward surfaces 72 and 73 of the inner and outer toes 66 and 67 are similarly inclined so that any longitudinal or axial force pressing one of these inclined latch surfaces against the similarly inclined surfaces of the toe-receiving recess, will produce a camming action with respect to the latch, tending to deflect the latch in a direction away from the recess in which the inclined surface of the toe is thus being acted upon.

Intermediate the operating shell 25 and the stationary (axially stationary) innermost sleeve 17, any suitable yieldable or resilient detent or retainer may be provided, for yieldably retaining the operating shell 25 in any one of a series of predetermined positions with respect to the innermost sleeve 17 (in an axial or longitudinal direction), an example of such means is the spring-pressed ball 75 within a generally radial chamber 76 in a hub 24 of the operating shell 25, yieldably urged into and mounted in engagement with the series of suitably shallow recesses 77, 78, 79, 80 and 81 by means of the helical compression spring 82 held in position by the screw 83.

Figure 4:
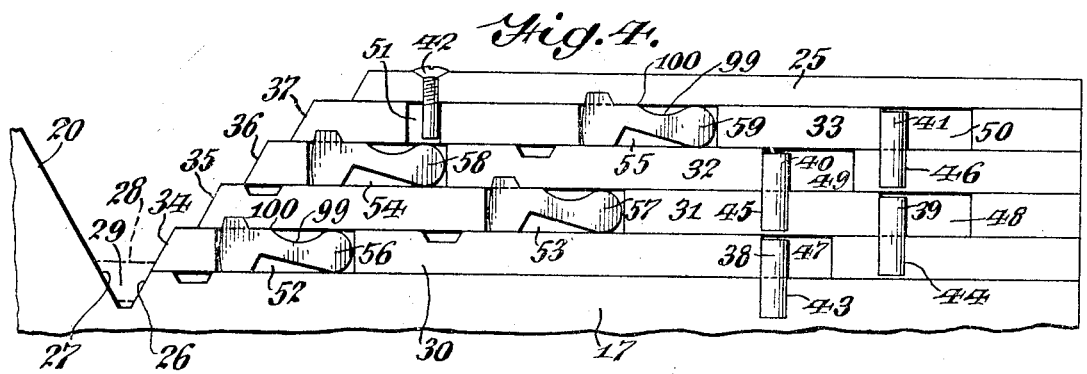
Figure 4 is a schematic representation of the mode of operation of the nested sleeves;—the sleeves being represented here as slides without regard to the cylindrical character of the device and showing the device in the open condition, that is, with the smallest effective diameter.
Figure 5:
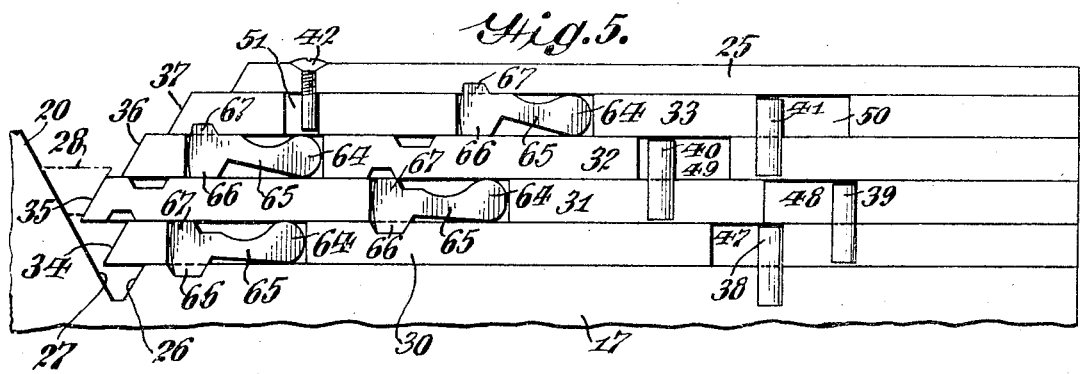
Figure 5 represents a similar schematic view of the device in an incompletely shifted position between the 1st and 3rd positions (considering the smallest diameter as the 1st position).
Figure 6:
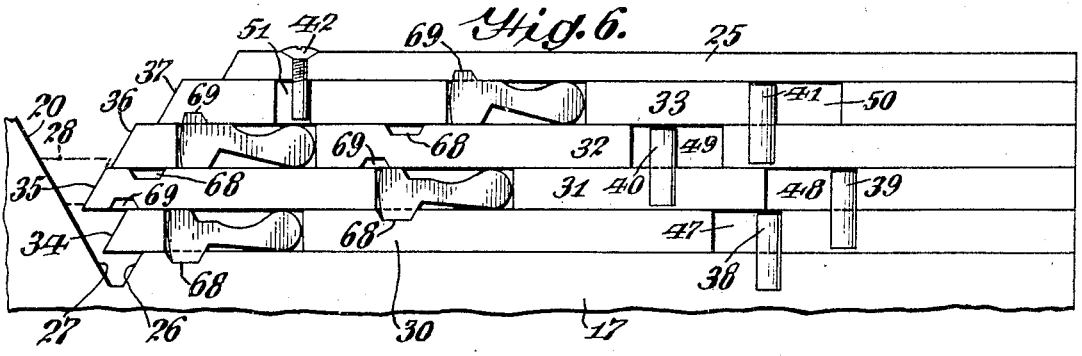
Figure 6 represents a similar schematic view of the device in the 3rd position.
Figure 7:
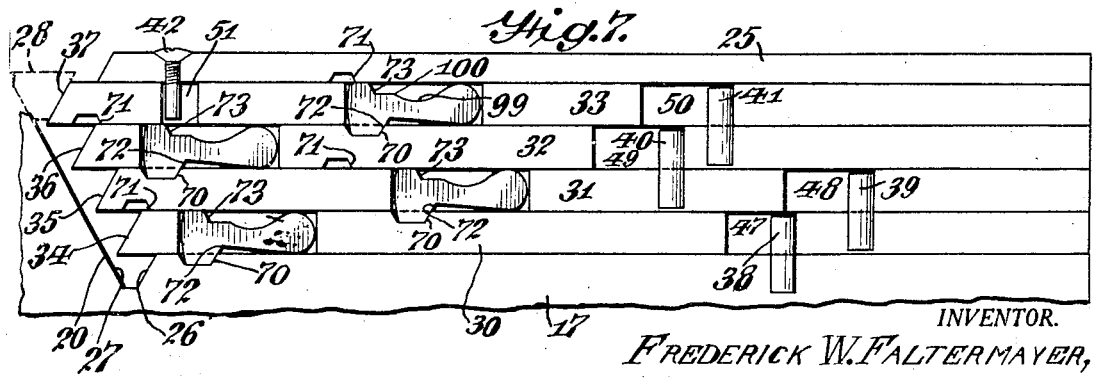
Figure 7 represents a similar schematic view representing the device in the closed condition with the largest effective diameter.

It will be observed that in the fully retracted or "open" position of the sleeves and operating shell 25, (see Figure 2 and 4), the latches 56, 57, 58 and 59 are all in their outwardly deflected positions with their outer toes 67 seated in the respective toe-receiving recesses 69, thereby causing an axial interlocking engagement between the operating shell 25 and each of the series of telescopic sleeves 30, 31, 32 and 33, and causing these four sleeves to be moved in unison with or to be moved as one with the outer operating shell 25. Thus, a displacement of the operating shell 25 in the direction of the arrow 84 causes all four sleeves as well as the outer shell 25, to move forward in unison or as one, until the innermost sleeve 30 has been moved into its operative position indicated in dotted lines, at which point the keying pin 38 riding in the slot 47, stops the movement of the sleeve 30 in the direction of the arrow 84. The point at which the sleeve 30 is stopped by the keying pin 38 is generally the point at which the inner toe 66 of the latch 56 is in registration with the toe-receiving recess 68. Hence, a slight further movement of the operating shell 25 in the direction of the arrow 84 until the spring-pressed retainer member 75 is seated in the next recess or notch 78, first produces pressure between the inclined camming surfaces 71 and 73 of the outer toe 67 and the corresponding toe-receiving recess 69 in the sleeve 31, which then in turn exerts a camming action upon the latch 56 and causes the resultant deflection of the latch 66 in an inward direction with the inner toe 66 thereof seated in the innermost toe-receiving recess 68. A slight further movement of the operating shell 25 in the direction of the arrow 84 causes the sleeve 31 to ride slightly over the top of the toe 67 of the latch 56, thereby locking said latch 56 in its inwardly deflected position. This is the position in which the spring-pressed retainer 25 is seated in the recess or notch 78. The corresponding position of the sleeve 30 is indicated by the dotted lines numbered 30—b, while the position of the sleeve 31 with respect to the sleeve 30 is indicated by the dotted lines 31—b, which generally indicates the extent to which the sleeve 31 overrides the latch 56, thereby to lock it in its inwardly deflected position.

This forward motion of the sleeve 30, into its operative position shown in dotted lines 30—b, causes the belt 28 to ride up on the inclined surface 27 and the surface 34 of the sleeve 30. In order to permit the belt to ride up more readily upon and onto the inclined surface 34 of the sleeve 30, as the sleeve 30 advances toward the belt, the distances between the inclined belt-engaging surfaces of the sleeves and the inclined surface 27 of the flange 20, are so proportioned with respect to the belt, that a small outermost part of the belt extends outwardly (in a radial direction) beyond the outermost diameters of the inclined surfaces 26, 34, 35, 36 and 37, respectively, so that the next sleeve will catch the outermost edge of the V-belt as the sleeve advances towards the V-belt and insure the V-belt riding up on the sleeve as it advances.

It will be noticed that with the exception of the innermost sleeve 30, as well as the operating shell 25, while over-riding the latch of the "active" sleeve, thereby to lock the "active" sleeve against axial movement, the sleeves do not themselves necessarily advance sufficiently to come into contact with the belt, but may stay behind a slight distance so that the belt does not contact any sleeve except the "active" sleeve, so that it cannot exert any axial pressure upon the next outwardly adjacent "inactive" sleeve to tend to displace it and cause it to "unlock" the "active" sleeve by releasing the latch thereof. These settings are entirely a matter of distances between the notches or recesses 77, 78, 79, 80 and 81, and the spacing of the toe-receiving recesses and the length of the key slots 47, 48, 49 and 50, and the spacing of these notches, toe-receiving recesses and key slots with respect to each other.

With the movement of the operating shell 25 into the next position defined by the notch 79, the sleeve 31 moves forward into engagement with the belt and moves forward until it is brought into its operative position indicated by the dotted lines 31—c, while the outwardly adjacent sleeve 32 in turn rides up onto and then slightly over the outer toe 67 of the latch 57 of the sleeve 31, causing it first to be deflected inwardly with its inner toe 66 in locking engagement with the corresponding toe-receiving recess 68 and then locking the latch in this position, as indicated by the dotted lines 32—c. This action is repeated with the successive sleeves as the outer shell is moved to the next succeeding notches 80 and 81 until the outer shell 25 rides over the outer toe 67 of the outermost latch 59, thereby locking it in position. The decrease in the effective diameter is effected by merely moving the operating shell 25 in the reverse direction indicated by the arrow 85. The action of the parts is reversed by this motion.

By oppositely disposing the units 15 and 16 as indicated in Figure 1, and by interconnecting the operating shells 25 thereof by the mechanism shown, the two coacting units 15 and 16 are oppositely and simultaneously varied to the same extent. Thus, when the unit 15 is set to its smallest diameter, as indicated in Figure 2, the opposite unit will be set to its largest diameter, thus permitting a variation without any appreciable elongation of the belt, since the increase in one diameter is generally compensated for by the corresponding decrease in the other diameter.

In the particular illustration of my invention here shown, each hub 24 of the respective operating shells 25 is provided with an annular groove 86, in which corresponding forks 87 and 88 ride freely so as to permit the free rotation of the hubs and the entire rotating mechanism, while permitting the forks to remain rotationally stationary. The forks 87 and 88 may be carried by suitable sliding members having rectilinear motion (or they may be carried by pivotally supported members with angular motion, as desired). In the particular illustration of my invention here shown, the actuating forks 87 and 88 are carried by slidable racks 13 and 14, which are slidably mounted in suitable guides 91 and 92 and 93 and 94 of any suitable construction sufficient to guide these slots or racks. The toothed portion of the racks meshes with corresponding pinions 95 and 96 carried by the common shaft 97, which in turn, may be suitably journalled in any suitable bearings carried by any suitable frame, housing or supporting structure of the machine or unit in which this invention may be embodied. Through any suitable handle 12 provided on a shaft 97, the two operating shells 25 may be set successively into any one of their several operative positions as defined by the notches 77, 78, 79, 80 and 81, thereby causing a change in mechanical ratio corresponding to the opposite variations in diameters of the two units 15 and 16.

It should be understood that the latches and respective latch-receiving chambers or slots and the corresponding toe-receiving recesses may also be duplicated around the circumferences several times so as to secure greater uniformity of action and prevent cocking of one sleeve with respect to another. Here too, the successive latches are staggered slightly in two different planes at a suitable angle to each other, so as to clear each other.

It should be understood that the foregoing drawings and description are merely illustrative of the present invention and that the arrangement of the parts may be varied without departing from the present invention. Thus, the latch members may be varied in shape or may be varied in contour. Likewise, the arrangement of the actuating elements 13 and 14 and 95 and 96 may also be varied. Thus, for instance, instead of the racks 13 and 14 being between the two units as shown, they may be on the outside of the two units; and likewise, the forks 87 and 88 may be pivotally mounted upon pivotally supported arms suitably interconnected for the desired motion and being provided with any suitable operating handle. It will be observed also that the outermost edges of the latch members are provided with a slight cut-out 99 which produces a slight pivot edge or corner 100 intermediate the two ends of the latch. This, combined with the slight radial clearance between the pivotal portion 64 of the latch member and the radial width of the latch chamber, causes the latch to be slightly pivoted around the point 100 when deflected inwardly. This slight pivotal support in the inward movement of the latch members lessens the force required to move the latch members inwardly. Thus, because of the fact that the speed change operation of the device may take place while the mechanism is in rotation, centrifugal force may be present on the latch members urging them outwardly. In order that this centrifugal force may be more readily overcome or in effect, neutralized to a large extent, the pivotal point 100 is provided so that the pivotal end 64 of the latch member will balance the opposite end of the latch member about the pivot point 100 and thus tend to neutralize the centrifugal force and permit the latch member to be deflected inwardly with less force.

It should be understood that anti-friction bearings, such as ball-bearings or tapered roller bearings may be provided between relatively moving parts, particularly for taking the thrust. Thus, anti-friction thrust-bearings may be interposed between the upper and lower ends of the rotating members 17, and the supporting structure or bearing brackets between which the members 17 are confined. In this manner the thrust incident to the shifting operation will not materially increase the frictional resistance.

As pointed out hereinabove, the outwardly adjacent sleeve (31, 32, 33) or the operating shell (25) must override the outer toe of the latch or latches (if a plurality of angularly distributed latches are employed) of the sleeve to be locked in its inward or belt-engaging position. The extent of this override may be such as to bring the conical belt-engaging surface of the outwardly adjacent sleeve flush with the conical belt-engaging surface of the sleeve to be locked in operative position, or the override may be slightly less than what would bring these two surfaces into complete alignment with each other so that the conical surface of the outwardly adjacent sleeve will still be receded or offset a slight amount so that the belt will not quite contact the outwardly adjacent sleeve through which the operative sleeve is locked in position. Whether the outwardly adjacent sleeve (through which the operative sleeve is locked in place) overrides to an extent sufficient to bring its belt-engaging surface flush with the belt-engaging surface of the operative sleeve, or whether it overrides to a somewhat lesser extent, is more or less optional, because whether the outermost portion of the belt can contact the outwardly adjacent sleeve or not, will have no appreciable effect upon the security of the lock or cannot, in fact, unlock the operative sleeve, because as will be appreciated, the conical belt-engaging surface of the operative sleeve determines the sidewise movement of the belt or determines the lateral position of the belt so that the belt cannot exert any such substantial pressure upon the outwardly adjacent belt through any slight contact therewith as to displace the same into its unlocking position.

Upon the shaft 97, a dial or quadrant may also be provided in juxtaposition to some stationary index on the frame of the machine or transmission unit whereby the successive settings of the speed change mechanism may be visually indicated by suitable markings, calibrations, or the like. In juxtaposition to such markings or calibrations, I may also provide on certain machines, as for instance, on drill presses, a tabulation or an indication of tool sizes, such as drill sizes with which the particular speed setting may be most effectively or efficiently used. In this manner, the use of incorrect or detrimental speeds in certain operations may be minimized or avoided. Thus, as the effectiveness and in fact, the durability of drills and the life of drills may depend on the use of the correct speed, and as the choice of speed normally involves a certain amount of judgment, by the use of such calibrations through a dial index or quadrant and by the notation of drill sizes or range of drill sizes, for which any speed is suitable, the element of judgment may be completely eliminated and the use of correct drill speeds insured.

If desired, the shifting operation may be effected through suitable remote control, as for instance, by flexible thrust cables passing through suitable conduits extending to each of the racks 13 and 14, and motivating the same simultaneously and to the same extent. So too, pivotal link chains passing through suitable conduit pipes may be used for exerting the desired thrust and pull upon the slides 13 and 14 for effecting a simultaneous and remote control of the two sets of shiftable sleeves.

While in the foregoing description and accompanying drawings, specific reference in illustrations is made only of conical belt-engaging surfaces for coaction with the type of belt generally referred to as a V-belt it is to be understood that my invention may be applied with suitable modification for use in connection with flat belts. Thus, instead of providing successive conical belt-engaging surfaces, I may provide cylindrical belt-engaging surfaces on the ends or near the ends of the successive sleeves with a suitable conical or similarly inclined surface intermediate the end of the sleeve and the belt-engaging surface of the sleeve for picking up the belt from the belt-engaging surface of the inwardly engaging sleeve onto the belt-engaging surface of the outwardly engaging sleeve in the course of shifting. In this connection, the shifting of the two sets of shiftable sleeves may be somewhat differently timed insofar as the shifting of one set towards a lesser diameter may be slightly advanced ahead of the shifting of the other set towards the larger diameter so as possibly to give a slight slackening of the belt before the one set of sleeves is shifted to a larger diameter position. This is not, however, entirely necessary, as there may be sufficient give in the belt to compensate for the momentary slight variation in overall belt length required to effect the shift.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I hereby claim as new and desire to secure by Letters Patent is:

1. In a speed change device, a pulley comprising a fixed member and an adjustable member cooperating therewith, said adjustable member comprising a plurality of axially shiftable, nested cylindrical sleeves; a cam operated tiltable latch adapted to lock one of said sleeves to the other in an axial direction, means carried by said sleeves for camming the latch from one locking position into another locking position whenever a sleeve is shifted in either direction, and means whereby said axial movement of said sleeves is limited in respect to each other and said latch engaging positions.

2. In a speed-change device, a pulley comprising a fixed member and an adjustable member cooperating therewith, said adjustable member comprising a plurality of nested cylindrical sleeves, each having generally similar belt-engaging surfaces of successively varying effective diameters, a latch chamber in each of said sleeves intermediate the two sleeves adjacent thereto, a latch in each of said chambers having inner and outer detent portions provided with cam surfaces and a plurality of alternate fulcrums, each inwardly adjacent sleeve having a detent-receiving recess adapted to receive the inner detent of the latch in the operative or belt-engaging position of the sleeve, and each outwardly adjacent sleeve having a detent-receiving recess adapted to receive the outer detent portion of the latch in the retracted or inoperative position of the sleeve and means for shifting said sleeves.

3. In a speed change device, a pulley comprising a fixed member and an adjustable member cooperating therewith, said adjustable member comprising a plurality of axially shiftable, nested cylindrical sleeves; an elongated latch having a fulcrum located intermediate of its ends and adapted alternately to assume either one of two opposite locking positions, said latch being adapted to lock one of said sleeves to the other in shiftable relation, means carried by said sleeves for camming the latch about said pivot point from one locking position to the other, whenever said sleeves are shifted in either direction, and means whereby said axial movement of said sleeves is limited in respect to each other and said latch engaging positions.

FREDERICK WM. FALTERMAYER.